United States Patent [19]
Ziegler et al.

[11] Patent Number: 4,542,495
[45] Date of Patent: Sep. 17, 1985

[54] HERMETICALLY SEALED DISK CARTRIDGE WITH ADJUSTABLE OPTICAL WINDOW

[75] Inventors: William R. A. Ziegler, Longmont; Richard B. MacAnally, Boulder, both of Colo.

[73] Assignee: Storage Technology Partners II, Louisville, Colo.

[21] Appl. No.: 547,271

[22] Filed: Oct. 31, 1983

[51] Int. Cl.$^4$ .................. G11B 17/04; G11B 23/02
[52] U.S. Cl. .................. 369/273; 206/309; 206/313; 369/291; 369/292
[58] Field of Search .............. 369/290, 291, 292, 289, 369/284, 273; 206/309, 313

[56] References Cited
U.S. PATENT DOCUMENTS

| | | | |
|---|---|---|---|
| 4,277,810 | 7/1981 | Helmrich | 206/444 |
| 4,433,410 | 2/1984 | Siyyj et al. | 369/291 |
| 4,477,894 | 10/1984 | Clurman | 369/291 |

*Primary Examiner*—Steven L. Stephan
*Attorney, Agent, or Firm*—Bryant R. Gold; James R. Young

[57] ABSTRACT

A hermetically sealed cassette cartridge is disclosed, which encapsulates an optical disk suitable for use in an optical information recording and retrieval device. The cassette cartridge comprises a structural casing having a cavity for containing said recording medium and a spindle hub adapter for rotating the disk for data access. Data transfer is accomplished through a flexibly mounted transparent window, said window serving not only as a hermetical seal but also to alleviate the need for a thick dust defocusing layer on the said encapsulated recording medium.

1 Claim, 3 Drawing Figures

HERMETICALLY SEALED DISK CARTRIDGE WITH ADJUSTABLE OPTICAL WINDOW

BACKGROUND OF THE INVENTION

The present invention relates to the field of protective coverings, and more particularly to cartridges containing information storage and retrieval medium, and even more particularly to optical information recording disks.

Due to the delicate nature of the surfaces of magnetic and optical information storage media, a wide selection of means have been developed for protecting such media. Since the potential for damage is much greater for media which is used in a device having removable recording structures, primary effort has been directed to protecting such removable media. The integrity of such removable media is jeopardized in two different ways. The first is by exposure to the open atmosphere which presents the risk of contact with hostile contaminates. The second is by physical damage, which is an ever present risk due to the handling which occurs during loading and unloading operations.

In the more sophisticated computer equipment, presently in use and being developed, having significantly higher concentrations of data bit densities, attempts to preserve and protect said recording media integrity have included not only improved protective cassettes and cartridges with effort directed toward automatic loading and unloading devices, but also the incorporation of sophisticated air filter systems into the device to remove contaminates from the air to which the media is exposed. However, the advent of optical information recording has presented even greater new challenges in the area of recording medium integrity and protection. First, because optical information for recording is transmitted through free space, and secondly, because optical information may be recorded at a density that is several orders of magnitude denser than that achievable with magnetic recording media. Thus, the effect of random dust particles and other hostile contaminates, as well as casual damage to the recording medium, also increases by several orders of magnitude as the density or recorded bit population increases.

What is needed, therefore, is a protective cartridge for encapsulating information storage media which is hermetically sealed and in which the information storage medium may reside in a contaminate free state. In addition, the cartridge should provide substantial protection against physical abuse and damage of the recording medium contained therein.

SUMMARY OF THE INVENTION

The present invention is a hermatically sealed cartridge suitable for encapsulating an information storage disk, and in particular an optical information storage disk. The cartridge is hermetically sealed, thereby shielding the information recording disk from contaminate particles associated with open atmospheric conditions. Still further, the encapsulated disk is protected from damage and abuse associated with manual or mechanical handling.

Rotation of said media disk for information disk recording and retrieval purposes is accomplished through a spindle adapter which engages the drive spindle of the information storage and retrieval device.

Data access is accomplished by use of a light beam transmitted through a transparent window in the cartridge, which allows the beam to impinge upon (and be reflected from) the recording surface of the disk.

In addition to forming a barrier against entry of hostile contaminates into the interior cavity of the cartridge, the optical window advantageously provides other enhancements and features. First, the optically transmissive window is substantially smaller than the entire recording surface of said medium disk, so that the thickness, surface finish and parallelism of the optical surfaces is easier to achieve. Even more particularly, only the specific area over which the read/write head will radially travel need meet the critical specifications of the optical path of the system. Secondly, the window is readily exposed for maintenance and manual cleaning, consequently, special containers for storing said cassette cartridge are not required. Thus, because of the above, the need to apply a precise protective overcoat to protect the active layer of the disk surface is eliminated.

In addition, a stationary window reduces the effect hostile contaminate particles have upon the focus and transmission of transmissive light beams. Still further, since the window remains stationary, the external optical components which transmit and focus the beam can be located much closer to the window reducing the effect contaminates have upon light beam focusing. Indeed, the dimension between the external surface of the window and the recording surface of the disk is particularly significant in ensuring that the effect of any contaminate particle upon focusing is dramatically reduced. Consequently, the need for a thick defocusing coating upon said recording surface of the recording medium on longer exists.

DETAILED DESCRIPTION OF THE PREFERRED EMBODIMENT

The previously described features and advantages of the present invention will become more readily apparent in the following detailed description of the preferred embodiment. Said detailed description sets forth the best presently conceived model for embodying the objectives of the present invention. The description herein is presented solely for the purpose of describing the essential principle objectives of the present invention in a specific area of application and should not be interpreted as limiting the true scope of the invention as outlined in the appended claims.

Figure 1:
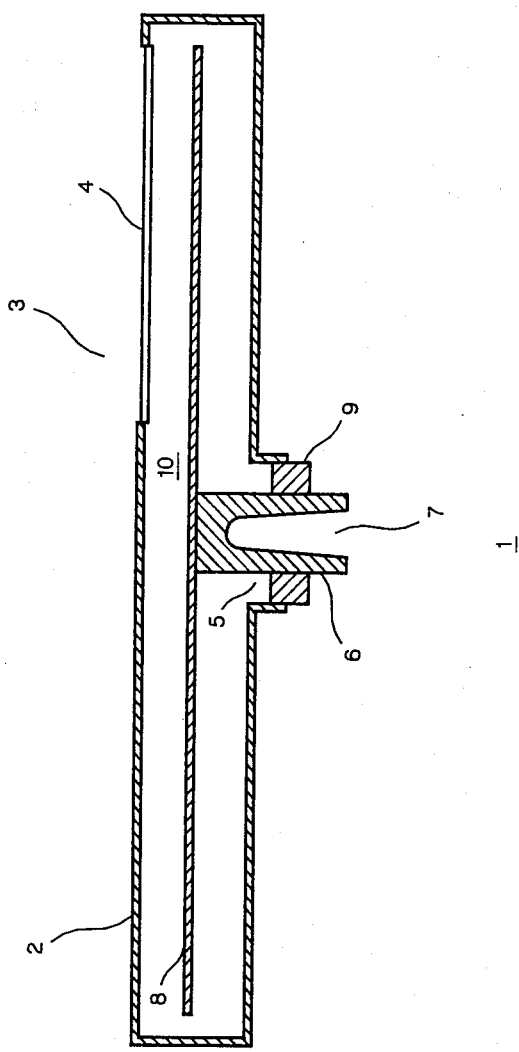
FIG. 1 is a general illustration of the present invention, showing the position of the basic elements thereof with respect to one another.

FIG. 1 is an illustrative representation of the assembly of components comprising the present invention a sealed optical disk cartridge 1. The cartridge casing 2 has a first opening 3 into which a transparent window 4 is mounted, and a second opening 5 into which a spindle adapter 6 is mounted, said adapter 6 having its inner opening 7 configured to closely and securely fit over the device spindle (not shown), and its outer surface securely fixed to the center of the disk 8 to be rotated.

The spindle adapter 6 is sealably mounted to the casing 2 by a frictionless bearing component 9, thereby preventing the entry of hostile contaminates into the cartridge cavity 10 containing the information recording and retrieval disk 8.

The spindle adapter 6 is fixedly attached to the information recording and retrieval disk 8 such that both components rotate when driven by the spindle to which said spindle adapter 6 attaches.

The cartridge casing 2, the optical window 4 and the sealed bearing 9 are all stationary components that do not move or rotate during the normal device operation. This fixed position is obtained by clamping the cartridge 1 into normal operating position upon insertion into the storage device.

Figure 2:
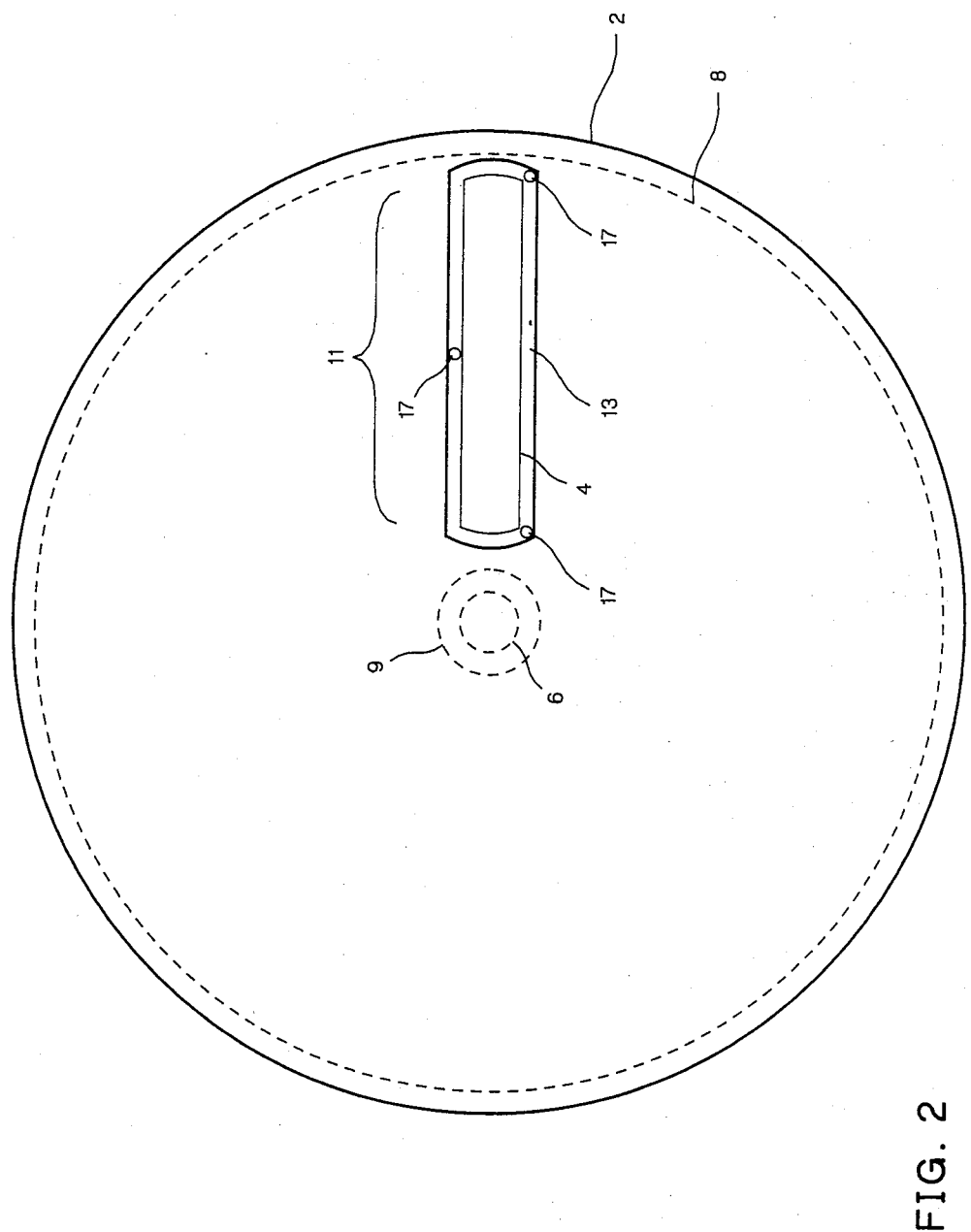
FIG. 2 is a top view of said cartridge illustrating the position of the said data access window with respect to the information storage area of the recording surface on the disk.

As shown in FIG. 2, the window 4 has an opening 12 sufficient to allow the entire recording surface of said disk 8 to be scanned upon a complete rotation of the disk 8. Thus, an optical read/write head (not shown) traversing an optical path coincident with opening 11 has access to every individual concentric data storage track on the recording surface of said information storage disk 8. In an alternative embodiment wherein surfaces exist on both sides of an information storage disk, said optical window 8 is duplicated as a second window located on the opposite side of said cartridge 1.

Since the optical path which is coincident with the opening 11 of window 4 of FIG. 2 is the critical optical area of said window 4, critical tolerances and anti-reflective coatings need only address this area, thereby reducing cost of manufacture of said window 4.

Figure 3:
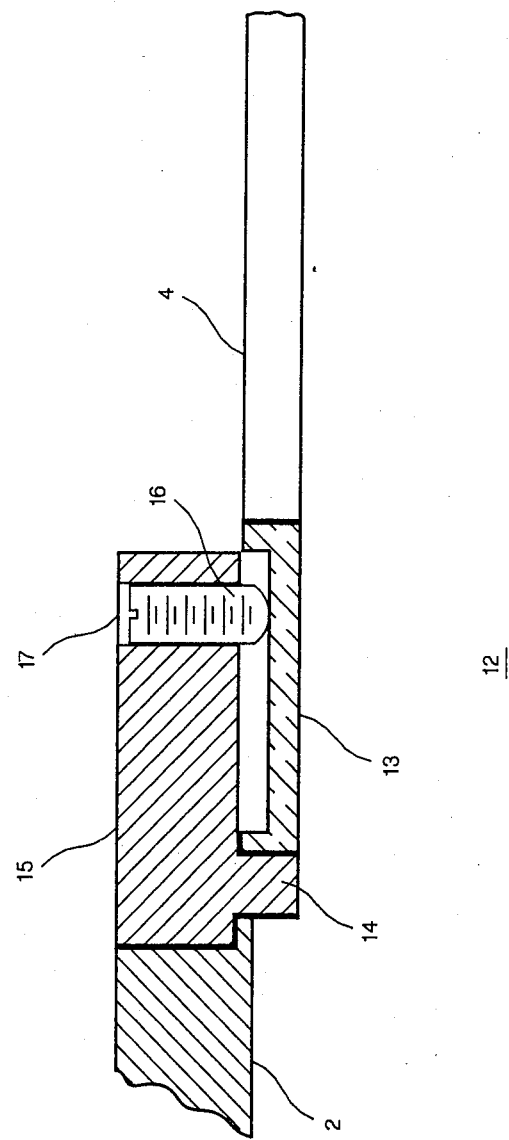
FIG. 3 is an exploded view of said transparent window assembly illustrating the elements of the adjustable window mounting design of the present invention.

FIG. 3 is an exaggerated illustration of the flexure assembly 12 for attaching the said optical window 4 to said cartridge casing 2 which will be instructive in describing the adjustability of said window 4. The outer circumference of the optically transmissive window 4 is securely and sealably bonded to the inner circumference of the flexure mount 13. The outer mating surface of said flexure mount 13 is in turn securely and sealably bonded to the downward protruding rim 14 of the window frame 15. Small threaded adjusting screws 16 are deposed within the threaded holes 17 of the window frame 15. Upon sealably bonding said window frame 15 to cartridge casing 2, said adjusting screws 16 are adjusted against said flexure mount 13 in a manner to effect the precise co-planar alignment of said window 4 with respect to the disk 8.

Correction of misalignment of said window 4 resulting from manufacturing tolerances is corrected by deflection of said flexure mount 13 adjustment of the screws 16 to move the window 4 to a position perpendicular to an impinging light beam. Protection from destructive deformation of said flexure mount 13 is accomplished by utilizing adjusting screws 16 whose maximum length is within the maximum flexure distance of said flexure mount.

While the preferred embodiment of the present invention is disclosed in conjunction with a computer information storage and retrieval device, it is obvious to those skilled in the art of protection of information storage media from hostile enviroments that the essential features and advantages may be applied to a wide number of recording devices.

We claim:

1. An information recording disk cartridge for protectively housing an information storage and retrieval disk in an optical information storage and retrieval device of a type having a disk rotating on a device spindle, said cartridge comprised of:

a cartridge casing for protectively housing said disk;

a light transmissive window;

means for sealably and adjustably attaching said light transmissive window in a first opening in said casing, said first opening located on an upper surface of said casing, said means comprising:

a window frame having an outer circumference securely bonded to said first opening in said casing, and having at least three threaded holes through an inner diameter for passage of threaded adjusting screws;

a flexure mount having an interior circumference sealably bonded around said window and an outer circumference sealably bonded to a rim on said window frame, said flexure mount therefor able to flex upward and downward; and at least three threaded adjusting screws having a length sufficient to pass through said window frame threaded holes and contact an upper inner surface of said flexure mount, such that said screws can be individually adjusted so as to place said window co-planar with respect to said disk disposed in said cartridge casing; and means for transmitting device spindle rotation to said disk disposed in said cartridge casing.

* * * * *